(12) United States Patent
Wilkosz et al.

(10) Patent No.: US 6,473,479 B1
(45) Date of Patent: Oct. 29, 2002

(54) DUAL OPTICAL COMMUNICATION NETWORK FOR CLASS 1E REACTOR PROTECTION SYSTEMS

(75) Inventors: Stephen J. Wilkosz, Vernon, CT (US); Raymond R. Senechal, East Hartford, CT (US); Gary D. Altenhein, Enfield, CT (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/247,868

(22) Filed: Feb. 11, 1999

Related U.S. Application Data

(60) Provisional application No. 60/075,849, filed on Feb. 25, 1998.

(51) Int. Cl.[7] ................................................. G21C 7/36
(52) U.S. Cl. ..................................... 376/215; 376/259
(58) Field of Search ................................. 376/215, 259

(56) References Cited

U.S. PATENT DOCUMENTS

| | | | |
|---|---|---|---|
| 3,888,772 A | | 6/1975 | Neuner ........................ 376/215 |
| 4,651,020 A | * | 3/1987 | Kenny et al. .................. 307/43 |
| 5,586,156 A | * | 12/1996 | Gaubatz ....................... 376/216 |
| 5,621,776 A | | 4/1997 | Gaubatz ....................... 376/242 |
| 6,049,578 A | * | 4/2000 | Senechal et al. .............. 376/215 |
| 6,292,523 B1 | * | 9/2001 | Senechal et al. ............. 376/259 |

FOREIGN PATENT DOCUMENTS

GB        2180975 A        4/1987

* cited by examiner

Primary Examiner—Michael J. Carone
Assistant Examiner—R Palabrica

(57) ABSTRACT

A communication network for nuclear plant protection systems includes monitoring and control channels, including a first pair of channels having first and second channels, the first pair of channels communicating through fiber optic data paths with a second pair of channels having third and fourth channels; a plurality of engineered safety feature trains, including first and second trains, the first train communicating directly with the first pair of channels and the second train, the second train communicating directly with the second pair of channels and the first train; a first vital power bus powering the first channel; a second vital power bus powering the second channel, and redundantly powering the first train and first vital power bus; a third vital power bus powering the third channel; and a fourth vital power bus powering the fourth channel, and redundantly powering the second train together with the third vital power bus.

5 Claims, 1 Drawing Sheet

DUAL OPTICAL COMMUNICATION NETWORK FOR CLASS 1E REACTOR PROTECTION SYSTEMS

This application claims the benefit of provisional application 60/075,849 filed Feb. 25, 1998.

BACKGROUND OF THE INVENTION

Reactor protection systems require periodic testing. Testing of reactor protection systems requires the exchange of status information between independent channels of plant protection systems ("PPS's") and trains of engineered safety features ("ESF's"). Digital implementation of these systems introduces the inherent problem of maintaining channel/train independence while sustaining communications integrity and function. Typical fiber optic communication networks provide the required electrical isolation and independence between channels and trains. However, they do not address the failure modes associated with them.

BRIEF SUMMARY OF THE INVENTION

Directed to achieving the foregoing and additional objectives and overcoming shortcomings of the prior art systems, a main object of the invention is to provide an optical communications network that provides a means for exchanging required information between redundant PPS channels and ESF trains.

A further object of the invention is to provide an optical communications network that provides required electrical isolation, fault tolerance addressing credible single failures which include loss of AC power from a single vital bus power source.

Still, a further object of the invention is to provide an optical communications network that employs a unique configuration of fiber optic cables, fiber optic modems, and power assignment to sustain the communications between independent and redundant PPS channels and independent and redundant ESF trains.

The above objectives and others are provided by a communication network for a nuclear power PPS, which includes a plurality of monitoring and control channels, including a first pair of channels which has a first and second channel, the first pair of channels directly communicating through a network of fiber optic data paths with a second pair of channels which has a third channel and a fourth channel; a plurality of engineered safety feature trains, including a first train and a second train, the first train communicating directly with the first pair of channels, and communicating directly with the second train, the second train communicating directly with the second pair of channels, and communicating directly with said first train; a first vital power bus, individually powering the first channel; a second vital power bus, individually powering the second channel, and redundantly powering the first train together with the first vital power bus; a third vital power bus, individually powering the third channel; and a fourth vital power bus, individually powering the fourth channel, and redundantly powering the second train together with the third vital power bus.

The communications network further includes a first plurality of fiber optic modems associated with each of the monitoring and control channels; and a second plurality of modems associated with each of the engineered safety trains. The first vital power bus individually powers a first group of modems, the second vital power bus individually powers a second group of modems, the third power bus individually powers a third group of modems, and the fourth vital power bus individually powers a fourth group of modems, the first, second, third and fourth groups of modems being part of the first plurality of modems.

Also, the first vital power bus redundantly powers a fifth group of modems, together with the second vital power bus, the fifth group of modems being part of said second plurality of modems; and the third vital power bus redundantly powers a sixth group of modems, together with the fourth vital power bus, the sixth group of modems being part of the second plurality of modems.

The above objects and others are also accomplished by a method of monitoring and controlling a nuclear power plant protection system, which includes the steps of providing a plurality of monitoring and control channels, including a first pair of channels which has a first and second channel, the first pair of channels directly communicating through a network of fiber optic data paths with a second pair of channels which has a third channel and a fourth channel; providing a plurality of engineered safety feature trains, including a first train and a second train, the first train communicating directly with the first pair of channels, and communicating directly with the second train, the second train communicating directly with the second pair of channels, and communicating directly with the first train, the communication occurring through the network of data paths; individually and separately powering the first, second, third, and fourth channels using a first, second, third, and fourth vital power bus, respectively; redundantly powering the first train using the first and second vital power buses; and redundantly powering the second train using the third and fourth vital power buses.

The method further includes the steps of providing a first plurality of fiber optic modems associated with each of the monitoring and control channels; and providing a second plurality of fiber optic modems associated with each of the engineered safety feature trains. The method also includes the steps of individually powering a first, second, third, and fourth group of modems using the first, second, third, and fourth vital power buses respectively, the first, second, third and fourth groups of modems being part of the first plurality of modems. The method may also include the steps of redundantly powering a fifth group of modems using the first and second vital power buses, the fifth group of modems being part of the second plurality of modems; and redundantly powering a sixth group of modems using the third and fourth vital power buses, the sixth group of modems being part of the second plurality of modems.

DETAILED DESCRIPTION OF THE INVENTION

Figure 1:
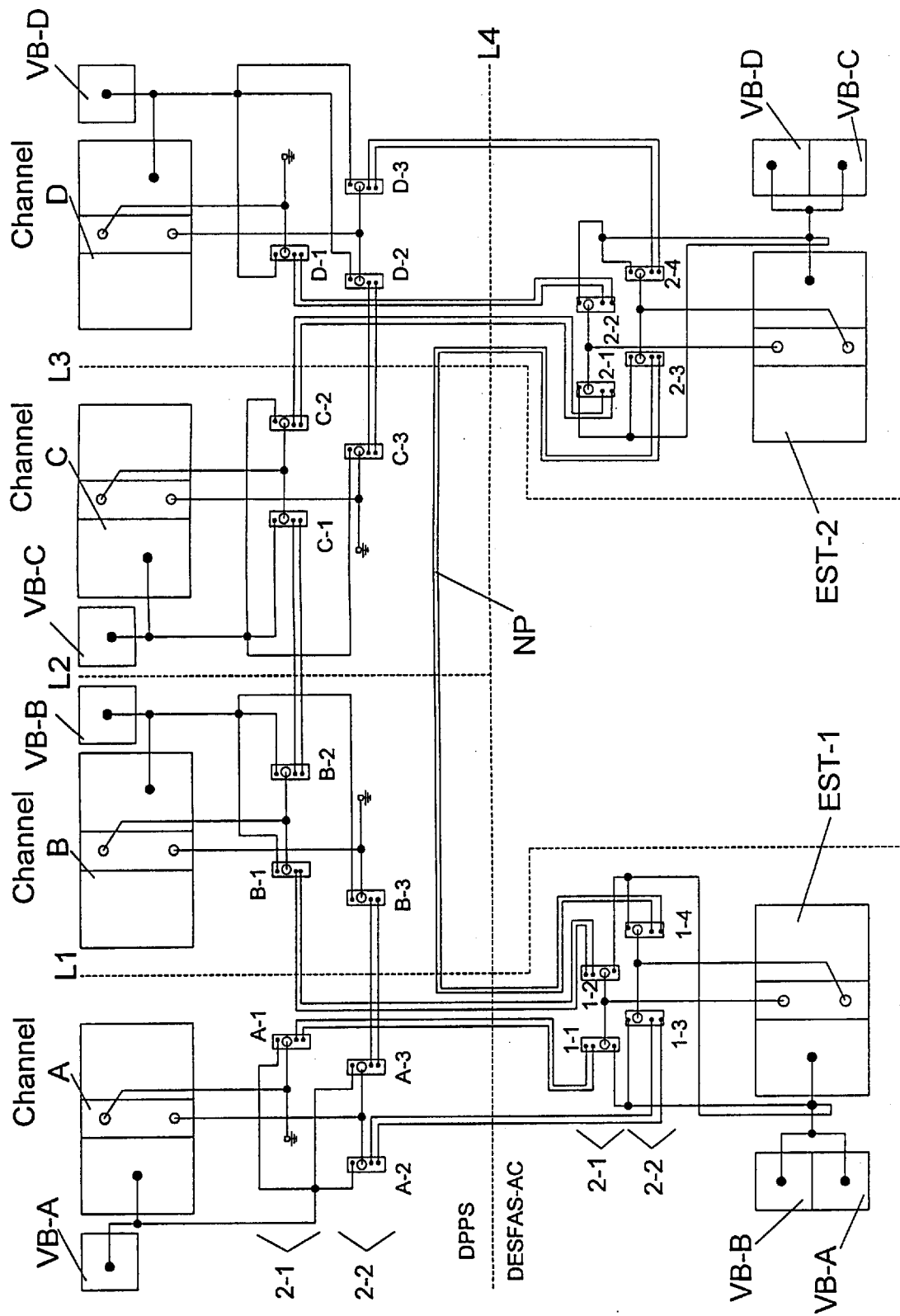
FIG. 1 shows interface and test processors (ITP) from a digital plant protection system (DPPS), and communication interface processors (CIP) from a digital engineered safety features actuation system auxiliary cabinet (DESFAC-AC) that make up an interface and test processor (ITP) network according to the present invention.

An ITP network for a nuclear power PPS is shown in FIG. 1. As shown, the network 10 topology includes four monitoring and control sub-systems designated, respectively, as Channel A, Channel B, Channel C, and Channel D. The various channels are separated by vertical dashed lines L1, L2 and L3 to symbolically indicate that the channels are physically separated from one another within the nuclear power plant. Each channel includes a bi-stable processor, a trip signal distributor, a coincidence logic processor, and initiation logic. The various channels communicate with two engineered safety feature trains, designated, respectively, as EST-1 and EST-2. As indicated symbolically by the horizontally dashed line L4, the engineered safety systems are physically separated from the various channels from which they receive their control signals and also separated from one another. The physical separation of the various subsystems enhances the probability of functional integrity being maintained in the event of damage to one part of the overall system.

Each of the channels, as described in the above-incorporated patent applications, include one or more sensors and digital processors that evaluate the sensed parameters. The various channels communicate with one another to provide two-out-of-four voting to determine whether or not a reactor trip command is appropriate. In the event a reactor trip command is issued by two or more of the channels, and engineered safety feature actuations are required, then the safety feature trains EST-1, EST-2 are actuated to provide reactor safeguard in attention to tripping the reactor. Each of the engineered safety feature trains EST-1, EST-2 implements a sequential series of events that effects reactor trip and engineered safety feature actuations, these events including various pre-programmed functions that control the timing and sequence of those tasks that must be accomplished to effect reactor safeguards, including operation and control of various valves, pumps, fluid levels, power levels, temperatures, pressures, and the like.

The monitoring and control system (Channels A, B, C, and D) and the two engineered safety feature trains (EST-1 and EST-2) communicate through fiber optic paths with electro-optic modems at the path terminals. In FIG. 1, three fiber optic modems are associated with each digital plant protection system channel and four fiber optic modems are associated with each engineered safety feature train. More specifically, fiber optic modems A-1, A-2, and A-3 are associated with Channel A; as shown, each of these modems is connected to a transceiver-type communications card in the Channel A functional block. In a similar manner, fiber optic modems B-1, B-2, and B-3 are associated with Channel B; fiber optic modems C-1, C-2, and C-3 are associated with Channel C; and fiber optic modems D-11, D-2, and D-3 are associated with Channel D. As in the case of Channel A, the modems associated with a particular channel are connected to a transceiver-type communications card within the respective channel function block.

Each of the engineered safety feature trains EST1, EST-2 are likewise serviced by modems. As shown in the FIG. 1, four fiber optic modems EST-1-1, EST-1-2, EST-1-3, and EST-1-4 are associated with the engineered safety train EST-1. Each of these modems is connected to a transceiver-type communications card in the engineered safety train EST-1 functional block. In a similar manner, fiber optic modems EST-2-1, EST-2-2, EST-2-3, and EST-2-4 are associated with the engineered safety train EST-2.

The network topology of the FIG. 1 is such that both Channel A and Channel B are paired with and connected to engineered safety train EST-1, and both Channel C and Channel D are paired with and connected to engineered safety train EST-2 with additional paths provided between the various channels and between both engineered safety trains EST-1 and EST-2. In the FIG. 1, the network paths are designated in a generic and representative manner by the designator NP. More specifically and as shown in the FIG. 1, A-1 connect to EST-1-1, A-2 connects to EST-1-3, A-3 connects to B-3, B-1 connects to EST-1-2, B-2 connects to C-1, B-3 connects to A-3, C-1 connects to B-2, C-2 connects to EST-2-1, C-3 connects to D-2, D-1 connects to EST-2-2, D-2 -connects to C-3, D-3 connects to EST-2-4, and lastly, EST-1-4 connects to EST-2-3.

Power to the four channels is provided through a system of vital power sources or busses. A vital power source is a high-reliability source that services a single channel. More specifically, and as shown, vital bus VB-A provides power to Channel A, vital bus VB-B provides power to Channel B, vital bus VB-C provides power to Channel C, and vital bus VB-D provides power to Channel D. The use of individual vital power sources for each of the channels of the overall system increases the probability that functionality will be maintained in the event of a failure of a part of the network. For instance, communication can be maintained in the network despite a postulated failure of a shared communication cable in the network path, failure of a modem, failure of a communication module in a channel or in a train, failure of a processor that controls the communication modules, or failure of a power source.

In order to further increase overall functionality, the present invention powers each of the engineered safety feature trains and their related fiber optic modems from two of the vital power buses and, more specifically, from the two vital power buses that power the channels that provide any reactor safeguard command into the engineered safety feature train. Thus, engineered safety feature train EST-1 and its associated modems are powered by vital power bus VB-A and vital power bus VB-B, as indicated in FIG. 1. In a similar manner, engineered safety feature train EST-2 and its associated modems are powered by vital power bus VB-C and vital power bus VB-D, as indicated in FIG. 1.

Power sourcing each engineered safety feature train and their associated modems from the power sources of the two channels that provide any reactor safeguard command into the engineered safety feature train thus assures operation of and communication to and from that engineered safety feature train and its modems in the event that one of the vital power busses becomes inoperative or otherwise unavailable.

For example, in the event that power to vital power bus VB-A is lost, all components in Channel A (including the modems associated with Channel A, i.e., A-1, A-2, A-3) will be rendered inoperable. However, the engineered safety feature train EST-1 associated with Channel A will still be powered from vital power bus B and retain functionality along with the fiber optic modems associated with engineered safety train EST-1. While the modems associated with Channel A will be rendered inoperative, communication with engineered safety train EST-1 will be maintained by its associated modems EST-1-1, EST-1-2, EST-1-3, and EST-1-4 that will continue to receive power from vital power bus VB-B.

The following is a description of the environment in which the communication structure shown in FIG. 1 sits in a preferred embodiment of the invention. U.S. Provisional Application No. 60/075,849, the disclosure of which is incorporated herein by reference, shows in FIG. 1 and FIG. 2 a DPPS communications structure and a DESFAS-AC configuration block diagram, respectively. The DPPS communications structure consists of three independent networks. Since all four channels are identical, only one channel will be explained and any differences will be described outside the general description. The DPPS programmable logic controller (PLC) network is a propriety high performance (1.5 Mbit/sec) serial communications network. Process data between the application programs in different PLC stations is exchanged in real-time deterministic performance and has the capacity to connect eighty stations. This network is based around the IEEE 802-4 standard, which utilizes a token bus master and supports both dual media and dual fiber optic networks.

The PLC internal network connects all of the stations in channel A and allows status and testing information to be provided from each station. The maintenance and test panel is also connected to the internal network for the purpose of insertion of bypasses, setpoint changes, and general system status. Failure of this internal network does not prevent the operation of the safety channel from performing its intended safety function. The bistable processor (BPS) trip outputs are directly hardwired to the local coincidence logic processor (LCL). The PLC internal network has no interconnection to any of the other three safety channels.

The cross channel network originates in the LCL processor from an independent communications interface card which forms a network which is capable of supporting an additional eighty stations. This network employs coax cable, three fiber optic transmitters, and three independent fiber optic cables to each three safety cross channel communication processors (CCCP). The cross channel processors, including one from each safety channel, form a complete independent communications network outside of the originating safety channel. The CCCP's purpose is to provide the trip information from the associated channel to the LCI, to support a two-out-of-three logic. Failure of this network is limited in its affect (to the originating network channel) which will automatically set its outputs to a conservative trip state upon network failure. The LCL processor also monitors a combination of BSP watchdog input counters every execution cycle. If these counters have not incremented, the LCL processor, based on the selected logic combination, sets all channel bistables to their in tripped condition. p The ITP network of the present invention, shown in FIG. 1, is another network employing an independent communications interface card and is capable of supporting an additional eighty stations. The ITP network is connected to the other safety channels' ITP's through the use of dual redundant fiber optics cables NP, which also connects to the digital engineered safety features actuation system auxiliary cabinet (DESFAS-AC) EST-1 and EST-2. The ITP network provides communication interface for information exchange between the PLC internal network, and the ITP's of the other three safety channels. The ITP thus supports the following interfaces:

ITP's in the other three channels;
plant Annunciator System (PAS);
reactor Trip Switchgear (RTSG); and channel test feedback for all four channels.

The data exchange on the ITP network from the DESFAS-AC EST-1 and EST-2 provides status/actuation information and provides feedback during surveillance testing of the DPPS. Complete failure of this network would not prevent the DPPS/DESFAS-AC safety systems from performing its safety function.

Common-mode-failure of the complete data communication structure does not prevent the DPPS/DESFAS-AC safety system from performing its safety function. In addition, the use of independent systems (i.e., diverse protection systems) and manual devices, would accommodate a common-mode-failure of the entire hardware and software DPPS and DESFAC-AC system.

The DESFAC-AC communications structure consists of two independent networks. Since both EST-1 and EST-2 are identical, only EST-1 will be explained.

The PLC internal network connects all stations in EST-1 and allows status and testing information to be provided from each station. The maintenance and test panel, whose purpose is to provide testing capability and overall system status, is also connected to this network. Failure of this network does not prevent the operation of the safety channel from performing its intended safety function. The DPPS engineered safety features actuations are directly wired over individual fiber optic cables, which are then electrically isolated, where the primary and secondary stations perform a selective two-out-of-four coincidence logic.

As explained above, the interface and test processor network of the present invention, as shown in FIG. 1, provides fault tolerance to credible single failures which includes loss of AC power from a single vital bus power source. The network is designed with dual cable redundancy and designated ITP network 2-1 and ITP 2-2 for discussion purposes. PLC internal networks and cross channel networks are all independent of the ITP network 1 and ITP network 2.

In the event of any single failure including a loss of single vital bus power, the remaining active nodes on the network continue to communicate over the network by alternate network paths. For example, a postulated failure of vital bus A power would render DPPS channel A inoperable as well as render the FOM's in channel A inoperable. This failure would effectively render ITP network 2-2 inoperable. Under this condition, ITP network 2-1 would remain operable and communications would continue between DPPS channels B, C, and D nodes and DESFAC-AC train A and B nodes.

The present invention best is suited for use in nuclear power plant control systems of the type having redundant monitoring and control channels that vector into engineered safety trains and advantageously provides an enhanced reliability power sourcing system for digital plant protection systems by effecting dual power sourcing of each engineered safety train from the vital power buses that power the channels that vector into the engineered safety train.

As will be apparent to those skilled in the art, various changes and modifications may be made to the illustrated enhanced reliability power sourcing system of the present invention without departing from the spirit and scope of the invention as determined in the appended claims and their legal equivalent.

What is claimed is:

1. A communication network for a nuclear power plant protection system, which comprises:

a plurality of monitoring and control channels, comprising a first pair of channels which includes a first and second channel, said first pair of channels directly communicating with a second pair of channels which includes a third channel and a fourth channel, through a network of data paths;

a plurality of engineered safety feature trains, comprising a first train and a second train, said first train communicating directly with said first pair of channels, and communicating directly with said second train, said communicating occurring through said network of data paths, said second train communicating directly with said second pair of channels, and communicating directly with said first train, said communicating occurring through said network of data paths;

a first vital power bus, individually powering said first channel;

a second vital power bus, individually powering said second channel, and redundantly powering said first train together with said first vital power bus;

a third vital power bus, individually powering said third channel; and a fourth vital power bus, individually powering said fourth channel, and redundantly powering said second train together with said third vital power bus.

2. A communications network as set forth in claim 1, which further comprises:

a first plurality of modems associated with each of said monitoring and control channels; and a second plurality of modems associated with each of said engineered safety feature trains.

3. A communications network as set forth in claim 2, wherein said first vital power bus individually powers a first group of modems, said second vital power bus individually powers a second group of modems, said third power bus individually powers a third group of modems, and said fourth vital power bus individually powers a fourth group of modems, said first, second, third and fourth groups of modems being part of said first plurality of modems.

4. A communications network as set forth in claim 2, wherein said first vital power bus redundantly powers a fifth group of modems, together with said second vital power bus, said fifth group of modems being part of said second plurality of modems, and said third vital power bus redundantly powers a sixth group of modems, together with said fourth vital power bus, said sixth group of modems being part of said second plurality of modems.

5. A communications network as set forth in claim 1, wherein said data paths are optical fiber paths, connected by fiber optic modems.

* * * * *